March 1, 1949.  A. KREMER  2,463,185

FASTENER

Filed Dec. 12, 1944

Inventor
ARTHUR KREMER.
By Haseltine Lake + Co
Attorney

Patented Mar. 1, 1949

2,463,185

UNITED STATES PATENT OFFICE 2,463,185

FASTENER

Arthur Kremer, London, England

Application December 12, 1944, Serial No. 567,847
In Great Britain November 26, 1943

1 Claim. (Cl. 85—5)

This invention relates to rivets and like securing devices such as plugs and screws, hereinafter referred to as plugs.

It is among the objects of the invention to provide a waterproof seal and also to secure improved adhesion between the plug and the material to which it is applied.

It is also among the objects of the invention to provide a convenient means of securing structural elements together in a temporary manner.

According to the invention, there is associated with the plug a composition which is adapted to take up a position between the plug and the material to which it is applied and, under the influence of heat or other means used for securing the plug, set or hardened in such position thereby to form a joint between the plug and the material to which it is applied.

According to the simplest embodiment, the plug is simply coated with the bonding composition.

According to another embodiment, the jointing composition may be contained in a groove or recess in the plug from which it is extruded in the process of securing the plug.

The jointing composition may consist of synthetic resin, rubber, or metal of a lower melting point than the material of the plug.

In certain cases, the jointing composition may be adapted to serve purposes other than strengthening and waterproofing the joint between the two parts. For example, where a rubber composition is extruded between the plug and the adjacent material, such composition will provide a cushioning effect which would be effective in certain cases in preventing chattering or vibration which would otherwise tend to weaken or destroy the joint. Again, a jointing composition having a greater coefficient of expansion than the material of the plug may be so disposed within the body of the plug that it bursts the plug and flows into an adjacent cavity in the member to which the plug is applied.

The invention will now be described by way of example with reference to the accompanying diagrammatic drawings, in which.

Figure 1:
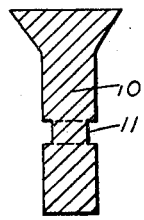
Figures 1 and 2 are sectional views of rivets according to the invention.

As shown in Figure 1, the body 10 of the rivet is formed with a peripheral groove 11 which may extend wholly or partly around said body. The bonding composition is located within said groove from which it is caused to flow by the application of heat after the rivet has been inserted. High frequency heating may advantageously be employed for this purpose.

Figure 2:
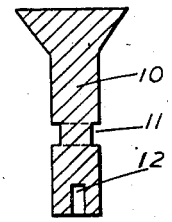

As shown in Figure 2, the body 10 of the rivet is formed with a peripheral groove 11 and with an end recess 12. Bonding composition is contained within both the peripheral groove and the recess and is adapted to be forced out of the body of the rivet when the rivet is inserted.

Figure 3:
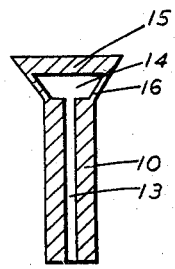
Figure 3 is a similar view of a rivet inserted in a structure.

The rivet illustrated in Figure 3 has a narrow bore 13 leading from the end face of the body 10 of the rivet to a cavity 14 in the head 15 thereof. Said head is formed with a narrow annular portion 16, which has portions of reduced thickness to form local weakenings. The cavity is filled with a bonding composition which has a coefficient of expansion greater than that of the material of the rivet. The rivet is shown inserted in two members 31 and 32 to be joined. The member 31 is suitably recessed to receive the head 15, and there is a cavity 33 adjacent the weakened annular portion 16 of the rivet. A pointed tool 34 can be thrust into the bore 13 to expand the end of the rivet so as to engage the member 32. The composition contained in the cavity 14 and bore 13 can be caused on being heated to rupture the weakened annular portion and to flow into an adjacent cavity 33 in the member 31 to which the rivet is applied. The tool 34 prevents the heated flowable composition from egress through the bore 13, and such tool may be also one electrode of a known high frequency electrical heating system.

Figure 4:
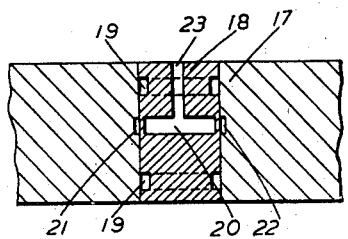
Figures 4 and 5 are sectional views of plugs according to the invention inserted in a structure.

Figure 4 illustrates the insertion of a plug according to the invention into a structure. The structural member 17 is bored to receive the plug 18 which is formed with annular grooves 19 and with a central cavity 20. Said cavity is of such dimensions that a narrow annular portion 21, constituting a weakened portion, is formed in the plug adjacent an annular groove 22 in the member 17. Bonding composition is contained within the groove 19 and the cavity 20, the bonding composition within the cavity 20 having a greater coefficient of expansion than the material of the plug so that it is adapted on expansion to rupture the narrow annular portion 21 and flow into the annular groove 22. If necessary, additional bonding composition can be forced into the cavity 20 and pressure exerted by way of the narrow bore 23 which communicates with an end face of the plug. During the time when the composition is flowable the mouth of the bore 23 is closed by the use of a tool such as shown at 34 in Figure 3.

Figure 5:
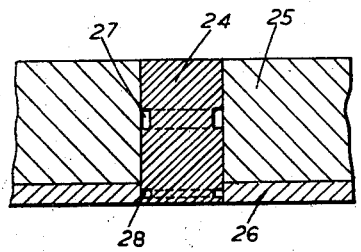

As shown in Figure 5, a plug 24 is adapted to connect two structural elements 25 and 26 which are suitably bored to receive the plug. The plug is formed with annular grooves 27 and 28, the length of the plug being such that the groove 28 is located in a portion of the plug extending beyond the face of the element 25. The plug is first inserted in the element 25 with bonding composition in the groove 27 and the bonding composition caused to flow to key the plug to the element 25. Bonding composition is then inserted in the groove 28, the element 26 applied and the bonding composition caused to flow to key the plug to the element 26. The joining or bonding composition may be any non-metallic cementitious substance; that is, substances capable of flowing on application of heat and of setting, upon cooling, to form a firm bond between, or cementing together, the members to be joined. Such cementitious substances may be synthetic resinous thermo-plastic materials.

What I claim and desire to secure by Letters Patent of the United States is:

A plug for insertion in an aperture formed by two adjacent members to be joined, said plug comprising, in combination, a body portion dimensioned to fit in said aperture, said body portion being at least partially hollow, said hollow portion being formed by a bore extending longitudinally for a portion of the length of said body portion and opening into a cavity extending transversely of said bore and said body portion, the wall of said bore being integral with the wall of said cavity, the wall portions of said body portion adjacent said cavity thereby comprising relatively weak wall portions, said weakened wall portions being imperforate and a non-metallic cementitious thermoplastic composition located in said hollow portion filling said cavity and extending into said bore which when heated, expands and breaks said weakened wall portions to egress therefrom and into said aperture whereby on cooling, said composition will set to bond said plug and said members.

ARTHUR KREMER.

REFERENCES CITED

The following references are of record in the file of this patent:

UNITED STATES PATENTS

| Number | Name | Date |
|---|---|---|
| 483,806 | Hull | Oct. 4, 1892 |
| 586,770 | Kempshall | July 20, 1897 |
| 612,235 | Dissosway | Oct. 11, 1898 |
| 1,257,197 | Dowd | Feb. 19, 1918 |
| 1,394,137 | Blair | Oct. 18, 1921 |
| 1,400,401 | Allan | Dec. 13, 1921 |
| 1,413,635 | Thomas | Apr. 25, 1922 |
| 2,064,503 | Temple | Dec. 15, 1936 |
| 2,122,814 | Hansen | July 5, 1938 |
| 2,207,191 | Geertz | July 9, 1940 |
| 2,318,415 | Patzschke et al. | May 4, 1943 |
| 2,321,414 | Parker | June 8, 1943 |
| 2,335,958 | Parker | Dec. 7, 1943 |
| 2,391,242 | Hurrey | Dec. 18, 1945 |

FOREIGN PATENTS

| Number | Country | Date |
|---|---|---|
| 372,405 | Great Britain | May 9, 1932 |
| 408,668 | Great Britain | Apr. 12, 1934 |
| 496,638 | Great Britain | Dec. 2, 1938 |